United States Patent

[11] 3,593,927

| [72] | Inventor | Keith G. Neill<br>Kew, Australia |
|---|---|---|
| [21] | Appl. No | 738,405 |
| [22] | Filed | June 20, 1968 |
| [45] | Patented | July 20, 1971 |
| [73] | Assignee | Imperial Chemical Industries of Australia and New Zealand Limited<br>Melbourne, Victoria, Australia |
| [32] | Priority | July 12, 1967 |
| [33] | | Australia |
| [31] | | 24,497/67 |

[54] PROCESS OF COMMINUTION OF AN AQUEOUS SUSPENSION OF COPPER PHTHALOCYANINE
8 Claims, No Drawings

[52] U.S. Cl............................................. 241/16,
106/288 Q, 260/314.5, 106/308 Q, 106/309,
106/308 N
[51] Int. Cl................................................... B02c 19/00
[50] Field of Search............................................. 106/288 Q,
308 N, 308 Q, 309, 308; 241/16; 260/314.5

[56] References Cited
UNITED STATES PATENTS

| 2,282,006 | 5/1942 | Sloan | 106/308 N |
| 2,556,727 | 6/1951 | Lane et al. | 106/288 |
| 2,699,440 | 1/1955 | Eastes et al. | 260/314.5 |
| 2,713,005 | 7/1955 | Baunsgaard et al. | 106/288 |
| 2,723,981 | 11/1955 | Tullsen | 260/314.5 |

FOREIGN PATENTS

| 956,515 | 4/1964 | Great Britain | 106/288 |
| 1,080,115 | 8/1967 | Great Britain | 106/308 N |

Primary Examiner—Tobias E. Levow
Assistant Examiner—H. M. S. Sneed
Attorney—Cushman, Darby & Cushman ABSTRACT: A process of comminution of an aqueous suspension of beta copper phthalocyanine, by vigorous agitation in a grinding mill, with a particulate grinding aid such as sand or beads of porcelain, glass or insoluble plastic material, the improvement which comprises milling in the presence of an alkyl glycol ether having at least one ethylene glycol unit in the molecule and of one or more amine salts bearing at least one alkyl substituent having 12 or more carbon atoms in the chain.

PROCESS OF COMMINUTION OF AN AQUEOUS SUSPENSION OF COPPER PHTHALOCYANINE

This invention relates to the manufacture of pigments in desired crystal form having high tinctorial strength and improved dispersibility and to improved pigment compositions.

It is known that certain pigments particularly beta phthalocyanines flocculate in organic media, for example when paints or printing inks containing them are stored, or during slow evaporation of solvent from a thick coating, with resultant loss of tinctorial strength and of homogeneity. Flocculation of pigment in a printing ink can also result in increased viscosity. Many pigments also exhibit crystal growth or polymorphic change in such media as are used for paints and printing inks and this frequently results in shade change and loss of tinctorial strength. Phthalocyanine pigments, particularly copper phthalocyanine, frequently suffer from all these defects.

It is also known that chlorine-free phthalocyanine compounds—for instance copper phthalocyanine, nickel phthalocyanine or metal-free phthalocyanine—are capable of existing in several crystalline forms which are readily distinguished by their X-ray diffraction patterns. The two most frequently encountered crystal forms have been designated in the art as alpha and beta respectively. Typical X-ray diffraction curves for the two modifications in the case of copper phthalocyanine are given in the drawing of Graham, U.S. Pat. No. 2,556,728.

The crude reaction products of the copper phthalocyanine pigments as obtained in their various syntheses are generally in the beta form, but many of the subsequent treatments hitherto devised for converting these crudes to the pigmentary state generally achieve also complete or partial conversion of the product to the alpha form. This is true, for instance, of the acid-pasting method, which customarily implies dissolution of the color in concentrated sulfuric acid followed by drowning in water, and of the dry salt-milling process (Lang and Detrick, U.S. Pat. No. 2,402,167).

Both the alpha and beta forms of copper phthalocyanine tend to grow large crystals when incorporated into paints or lacquers which contain as part of their liquid vehicle aromatic hydrocarbons and thereby suffer an undesirable decrease in tinctorial strength. It is therefore one objective in the manufacture of copper phthalocyanine pigments to obtain a noncrystallizing form of the pigment.

In addition alpha copper phthalocyanine suffers from the deficiency that under certain conditions, e.g. in the presence of aromatic hydrocarbons or under heat, it undergoes a change to the beta form, i.e. it is unstable; furthermore its shade is somewhat redder than beta. Beta, by contrast, is closer to true cyan. In certain applications, e.g. multicolor printing, beta copper phthalocyanine is therefore preferred.

Various procedures have been described for improving the resistance of pigments, particularly phthalocyanine pigments, to crystal growth and for improving dispersibility. Thus it has been proposed to coat pigment particles with colorless protective substances. The tinctorial strength of a pigment is reduced by coating in this way; moreover we have not found this to be an effective means of improving dispersibility.

It has further been proposed in British Pat. No. 972,805 to intimately incorporate with a pigment a minor quantity of an organic pigment derivative containing a secondary or tertiary amino group, the nitrogen atom of said group being attached to the remainder of the molecule through a methylene group.

We have now found that the resistance of beta copper phthalocyanine pigment to crystal growth can be improved, dispersibility can be increased and a pigment of high tinctorial strength substantially in the preferred beta crystal form may be obtained without the recourse to grinding in predominantly organic media, if said pigment is milled in an aqueous medium comprising an alkylether having at least one ethylene glycol unit in the molecule and a long chain amine salt.

Accordingly we provide, in a process of comminution of an aqueous suspension of crude beta copper phthalocyanine, by vigorous agitation in a grinding mill with a particulate grinding aid such as sand or beads of porcelain, glass or insoluble plastic material, the improvement which comprises milling in the presence of an alkyl glycol ether having at least one ethylene glycol unit in the molecule and of one or more amine salts bearing at least one alkyl substituent having 12 or more carbon atoms in the chain.

The milling is preferably carried out in the presence of an acid and the suspension is subsequently flocculated by precipitating the free base form of the amine or an insoluble salt thereof.

Whereas said alkyl glycol ether, by virtue of its solubility, remains dissolved in the aqueous medium and only extremely small amounts of it are adsorbed onto the pigment, the amine is precipitated or adsorbed onto and intimately attached to the pigment and is incorporated in the final pigmentary composition.

In addition it is advantageous to homogenize the flocculated suspension so obtained by passing it through homogenization means capable of subjecting said flocculated suspension to forces of high shear. Such means are well known and the homogenization process is widely practiced in the art; typical means are e.g. the kinetic dispersion mills described in "Organic Coating Technology" by Henry Fleming Payne, Vol. 2, pages 1,007 to 1,009, John Wiley and Sons, New York and London, 1961 edition.

We also provide a pigment composition comprising substantially pure beta copper phthalocyanine pigment and intimately incorporated with it a minor quantity of one or more amines bearing at least one alkyl substituent having 12 or more carbon atoms in the chain. By substantially pure we mean that at least 85 percent, usually up to 95 percent and even in excess of 95 percent by weight of the pigment is in its beta form.

The choice of the specific alkyl glycol ether is not narrowly critical; monoalkylethylene glycol ethers are particularly effective, e.g. ethylene glycol methyl, ethyl, propyl, isopropyl, butyl, isobutyl or amyl ethers; ethylene glycol n-butyl ether is most preferred.

Accordingly in our preferred process said alkyl ether is a monoalkylether of ethylene glycol, particularly ethylene glycol n-butyl ether.

Concentrations from 4 to 60 percent, preferably 20 to 40 percent by weight of ethylene glycol ether per 100 parts of pigment used in the milling process are suitable.

Suitable amines are the long-chain amines having at least one alkyl group comprising 12 or more carbon atoms in the chain; the chain, optionally, may be substituted, e.g. by other alkyl, aryl, amino, polyalkyleneoxy or carboxy groups.

Accordingly we provide a preferred process wherein the alkylamine has the formula

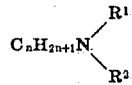

where $R^1$ and $R^2$, separately, may be hydrogen, alkyl, substituted alkyl or $-(C_2H_4O)_m R^3$ and, whenever $R^2$ is hydrogen, $R^1$ may also be $-(CH_2)_q NH_2$ or

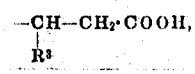

$R^3$ being hydrogen or an alkyl group having from one to four inclusive carbon atoms; where $n$ is from 12 to 20 inclusive, $m$ is an integer from 1 to 20 and $q$ is an integer from 1 to 3 inclusive.

Examples of amines according to this invention are e.g. hexadecylamine, octadecylamine; the amino alcohols or aminoether alcohols produced by condensation of a long chain amine with one to 20 molecules of an alkylene oxide, having two to four carbons, particularly ethylene oxide, which amino alcohols, optionally, may be terminally alkoxylated e.g. the compounds

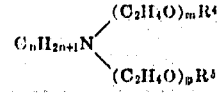

wherein $n$ is 12 to 20, $m$ and $p$ separately are an integer from 1 to 20 inclusive and $R^4$ and $R^5$ are defined as $R^3$ above; secondary amines bearing one long chain alkyl and a second alkyl group which optionally may be substituted by a carboxylic acid or an amino group, e.g.

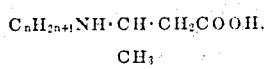

$C_nH_{2n+1}NH \cdot Ch_2 \cdot CH_2COOH$ and $C_nH_{2n+1}NH(CH_{2})_qNH_2$, where $n$ and $q$ are as above defined, and $q$ is preferably 3; the salts of any one of said amines may be formed with high molecular weight organic acids, particularly fatty acids e.g. oleic acid, and mixtures of these amines.

We also provide pigment compositions comprising from two to 12 parts per 100 parts of copper phthalocyanine of said amine;

Particularly preferred are the aliphatic amines having from 16 to 20 inclusive carbon atoms in the chain. Most preferred is the aliphatic diamine $C_{18}H_{37}NH.(CH_2)_3NH_2$.

Commercially available suitable long-chain amines are e.g. "Duomeen" T (essentially $C_{18}H_{37}NH(CH_2)_3NH_2$ "Duomeen" TDO (essentially $C_{18}H_{37}NH(CH_2)_3NH_2$ oleate), "Armeen" Z (essentially the addition product of octadecylamine and crotonic acid), "Armac" C (essentially octadecylamine acetate), all of which are Registered Trade Marks of the Armour Industrial Chemical Company, "Teric" 18M2(essentially the condensation product of octadecylamine with two molecules of ethylene oxide), "Teric" 18M5 (essentially the condensation product of octadecylamine with five molecules of ethylene oxide) and "Teric" 18M20 (essentially the condensation product of octadecylamine with 20 molecules of ethylene oxide). "Teric" is a Registered Trade Mark of Imperial Chemical Industries of Australia and New Zealand Limited. It will be understood that it is not a requirement that the long-chain amine be a chemically pure product; commercial products, many of which are mixtures of amines of varying chain length and even structure, are satisfactory.

The concentrations of amine are not narrowly critical; from two to 12 parts by weight of long-chain amine per 100 parts by weight of crude pigment are suitable; 5—10 percent is preferred.

Suitable concentrations of pigment in water are known in the art; thus 10 to 50 parts of pigment, particularly 20 to 45 parts of pigment per 100 parts of mill charge, all by weight, are suitable.

Throughout this specification the term mill charge means the total ingredients, excluding the particulate grinding elements, charged to the mill during the grinding process, and all proportions are given by weight, unless otherwise stated.

Acids suitable for dissolving long-chain amines are e.g. the lower alkanoic acids, e.g. formic, acetic, propionic, lactic acid or hydrochloric, sulfuric or phosphoric acid, desirably in an amount from 0.2 to 5 percent of the weight of the aqueous phase; in any case excess acid over the amount required to neutralize the amino groups of the amine, e.g. 10 to 200 percent molar excess is desirable. The preferred acid is acetic acid.

Suitable means for milling are known in the art.

The particulate grinding elements used in the process of the invention may be of any hard nonfriable material which is insoluble in the aqueous medium used. Particularly they may comprise sand, porcelain, glass, plastic or metal. Preferably the grinding aid is in the form of fairly uniform spheres about 0.5 millimeters or less in diameter.

Milling may conveniently be carried out in prior art apparatus, e.g. the apparatus described in Australian Pat. No. 241,606 or in the mills described in "Organic Coating Technogoty" by Henry Fleming Payne, John Wiley and Sons, Inc., New York and London, 1961 edition, Vol. 2, pages 1,002—1004 (sand grinder), As desired, the apparatus may be arranged to work continuously or discontinuously. When disc impellers are used in such a an apparatus, they may advantageously rotate at a rate such that the peripheral speed of the discs is about 500—3,000 feet per minute.

Completion of the process may readily be recognized by examining particle size of the pigment, which should be smaller than 1 micron. The particle size may be determined by electron microscopy, the disc centrifuge technique or simply by empirical comparison of tinctorial strength with a control sample meeting the particle size specification.

After completion of the milling the particulate grinding aid may be removed by conventional means, for example be sieving, and the pigment is flocculated by addition of a base, e.g. sodium hydroxide or ammonia or of the salt of a strong base and a high molecular weight acid, e.g. sodium oleate, and is then homogenized by a mill such as described in the above reference (Kady Kinetic Dispersion Mill, Payne, pages 1,007—1,008).

After the homogenization step the pigment composition is filtered, washed free of alkali, dried and may be ground in a known manner until it is a free-flowing powder.

The pigment compositions of the invention are of value as coloring matters for paints, lacquers, enamels, printing inks, plastic materials, and the like because they disperse rapidly in nonaqueous media to give high tinctorial strength and have a high degree of resistance to crystal growth.

The invention is illustrated but not limited by the following examples.

EXAMPLES 1 TO 14 INCLUSIVE

Table I shows the ingredients, and their proportions by weight, which were used for the preparation of pigmentary compositions according to the process of this invention.

The amine was dissolved in a mixture of the acetic acid and the alkyl glycol ether listed in table I (solvent); to this mixture the stated amount of water was added and the beta copper phthalocyanine was stirred in. The slurry was then milled with glass beads having a diameter of 0.5 mm. ± 0.05 mm. in the apparatus described in Australian Pat. No. 241,606 until the particle size of the copper phthalocyanine was less than 1$\mu$. The pigment suspension was separated from the glass beads (grinding elements) by filtration through a cotton cloth, made alkaline with 2N caustic soda solution and the flocculated slurry was homogenized for 5 minutes in a Kady high-speed kinetic dispersion mill as described in Payne above cited, pages 1,007 to 1,008, filtered, washed free of alkali and dried in an oven.

For comparison a control sample of a pigmentary composition according to the prior art was prepared as described in example 2 of British Pat No. 956,515. The pigments of examples 1 to 14 were then compared with the control sample and found to be equal to or superior in resistance to crystal and growth and dispersibility; when examined as a 20 percent lithographic ink they exhibited transparency, print finish and freedom from bronzing superior to that of the control sample. Thus an excellent product was obtained by a simple process without recourse to expensive, toxic and/or inflammable organic solvents. The comparison of tinctorial strengths of the 20 percent lithographic inks was carried out on a Hoover Automatic Muller machine according to the method described in the Printing Ink Manual, commissioned by the Society of British Printing Ink Manufacturers, published by W. Heffer and Sons, Cambridge, 1961, page 653.

Results of this quantitative comparison, expressing the tinctorial strength of the tested samples as parts required to achieve the tinctorial strength of 100 parts of the control sample (example 2 of British Pat. No. 956515) are given in table I.

It is generally agreed in the art that beta copper phthalocyanine is purer if it has a slight greenish shade and this shade is preferred, whereas alpha has a reddish hue. A degree of this green shade is thus a desideratum and a semiquantitative indication of purity of beta and of the absence of alpha. Comparisons with the control sample on this basis are also given in table I.

TABLE 1

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Beta copper phthalocyanine | 45 | 45 | 60 | 60 | 45 | 60 | 60 | 60 | 45 | 60 | 60 | 90 | 120 | 90 |
| "Duomeen" T | 4.2 | 2.8 | 4.2 | | 1.4 | | | | | | 4.2 | 4.9 | 8.4 | 6.3 |
| "Terric" 18M20 | | | | 3 | | 3 | | | | | | | | |
| "Terric" 18M2 | | | | | | | 4.2 | | | | | | | |
| "Armac" C | | | | | | | | 4.0 | | | | | | |
| "Armeen" Z | | | | | | | | | 2.8 | | | | | |
| "Terric" 18M5 | | | | | | | | | | 5 | | | | |
| "Duomeen" T DO | | | | | | | | | | | | | | |
| Ethylene glycol ether | Ethylene glycol methyl ether, 5.6 | Ethylene glycol ethyl ether, 3.8 | Ethylene glycol n-butyl ether, 16.6 | Ethylene glycol n-butyl ether, 36 | Ethylene glycol ethyl ether, 1.9 | Ethylene glycol n-butyl ether, 22.5 | Ethylene glycol n-butyl ether, 17.8 | Ethylene glycol n-butyl ether, 17.8 | Ethylene glycol n-butyl ether, 4.0 | Ethylene glycol n-butyl ether, 24 | Ethylene glycol ethyl ether, 22.5 | Ethylene glycol n-butyl ether, 15.4 | Ethylene glycol n-butyl ether, 17.2 | Diethylene glycol ethyl ether, 15.3 |
| Acetic acid | 2.4 | 1.6 | 2.4 | 6.3 | 0.8 | 6 | 2.4 | 31.5 | 1.6 | 6.3 | 1.5 | 2.1 | 1.7 | 2.0 |
| Hydrochloric acid as HCl | | | | | | | | | | | | | | |
| Water | 242.8 | 247.8 | 216.8 | 193.5 | 250.9 | 208.5 | 214.8 | 186.7 | 233.6 | 204.7 | 209.7 | 187.6 | 152.7 | 186.4 |

Comparison of tinctorial strength of examples when prepared as 20% lithographic ink (Control sample = 100 units)

| | 1 | 2 | 3 | 4 | 5 | 6 | 7 | 8 | 9 | 10 | 11 | 12 |
|---|---|---|---|---|---|---|---|---|---|---|---|---|
| Full shade | | Stronger, 92 | Stronger, 92 | Slightly stronger, 95 | | Close to equal, 98 | | Stronger, 92 | Stronger, 92 | Stronger, 92 | | Slightly stronger, 95 |
| Reduced shade | | Trace[2] greener | Trace[2] greener, do.[1] | Little[2] greener, do.[2] | | Trace greener, do. | | Equal, do. | Little greener, do. | Little greener, do. | | Little greener |

[1] Trace = minimum reproducibly detectable by naked eye, in accordance with empirical test standards.
[2] Little greener = two traces, in accordance with empirical test standards.

I claim:

1. A process of communition of an aqueous suspension of beta copper phthalocyanine, by vigorous agitation in a grinding mill, with a particulate grinding aid which comprises milling said phthalocyanine in an essentially aqueous medium containing from four to 60 parts by weight per 100 parts by weight of copper phthalocyanine, an alkyl glycol ether having at least one ethylene glycol unit in the molecule and from two to seven parts by weight per 100 parts by weight of copper phthalocyanine of one or more water-soluble amine salts bearing at least one alkyl substituent having 12 or more carbon atoms in the chain, said amine salts being derived from an alkylamine of the formula $$C_nH_{2n+1}N\begin{matrix}R^1\\R^2\end{matrix}$$

where $R^1$ and $R^2$, separately, are selected from the group consisting of hydrogen, alkyl and $-(C_2H_4O)_mR^3$ and whenever $R^2$ is hydrogen, $R^1$ may also be alkyl substituted with amino or carboxy, $R^3$ is hydrogen or an alkyl group having from one to four inclusive carbon atoms; $n$ is from 12 to 20 inclusive; and $m$ is an integer from 1 to 20 inclusive.

2. A process according to claim 1 wherein the alkylether is a monoalkyl ethylene glycol ether in which the alkyl group contains one to five inclusive carbon atoms.

3. A process according to claim 1 wherein between 20 to 40 parts of alkyl glycol ether per 100 parts of crude copper phthalocyanine are used.

4. A process according to claim 1 wherein $n$ is an integer from 16 to 20 inclusive.

5. A process according to claim 1, wherein the amine is $C_{18}H_{37}NH(CH_2)_3NH_2$.

6. A process according to claim 1, wherein the amine salt is a salt of acetic acid.

7. The process of claim 1 wherein the amine salt is a saturated fatty acid salt of an alkylamine having from 16—20 inclusive carbon atoms in the alkyl chain and the alkyl ether is a monoalkyl ether of ethylene glycol wherein the alkyl contains up to five carbon atoms.

8. A process according to claim 1 wherein $R^2$ is hydrogen and $R^1$ is a substituted alkyl selected from the group consisting of $-(CH_2)_q.NH_2$ and $$-\underset{R^3}{CH}-CH_2COOH$$

and $q$ is an integer from 1 to 3 inclusive.